L. HAEGE.
RAT, MOUSE, AND INSECT TRAP.
APPLICATION FILED MAR. 9, 1918.
1,286,601.
Patented Dec. 3, 1918.
2 SHEETS—SHEET 2.
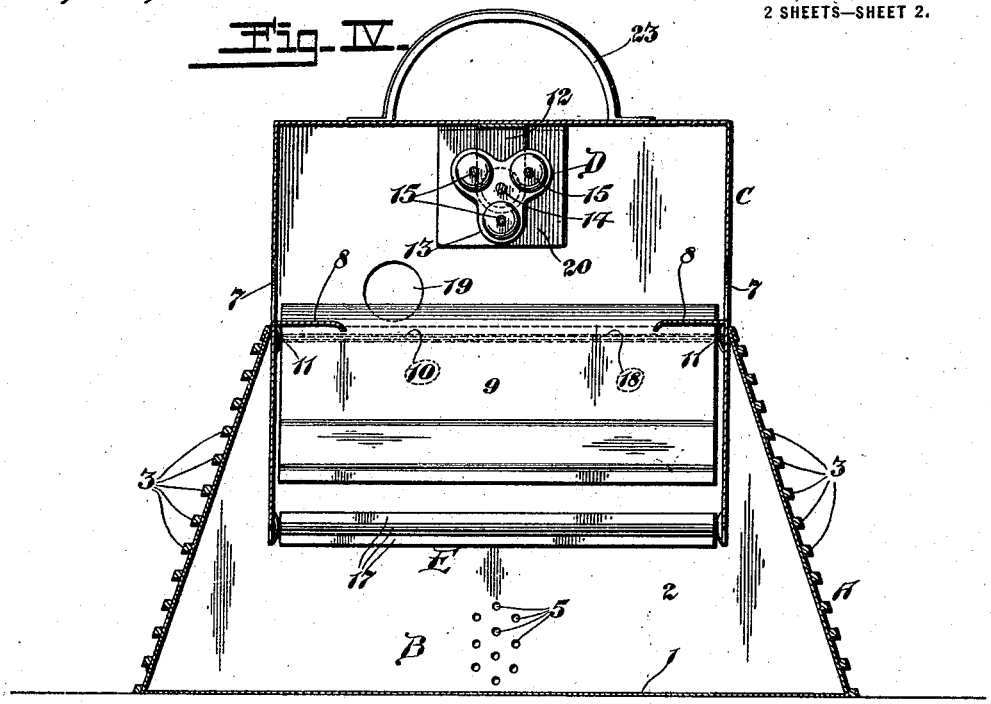
Fig. IV.
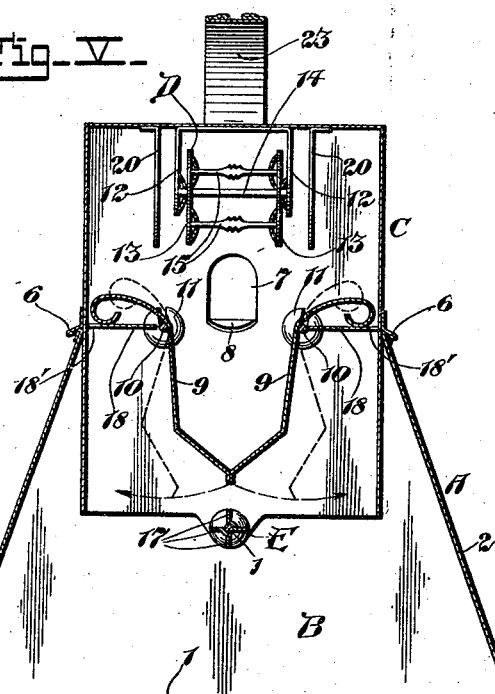
Fig. V.
Attest
Charles A. Becker.
Inventor
Louis Haege,
Knight & Cook
By His Attorneys

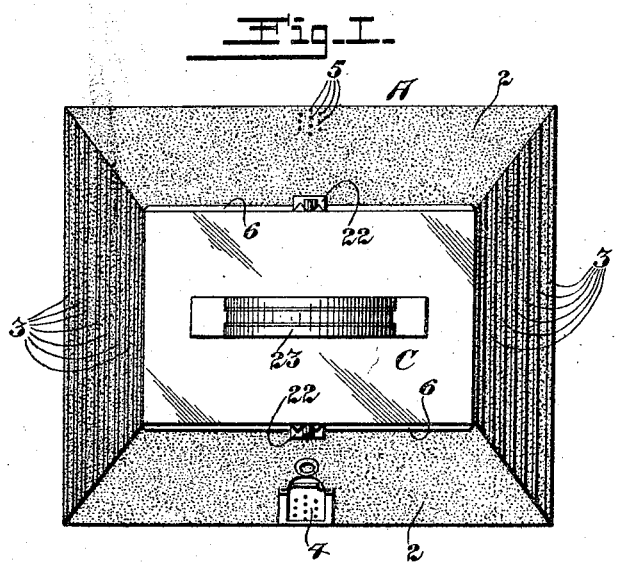
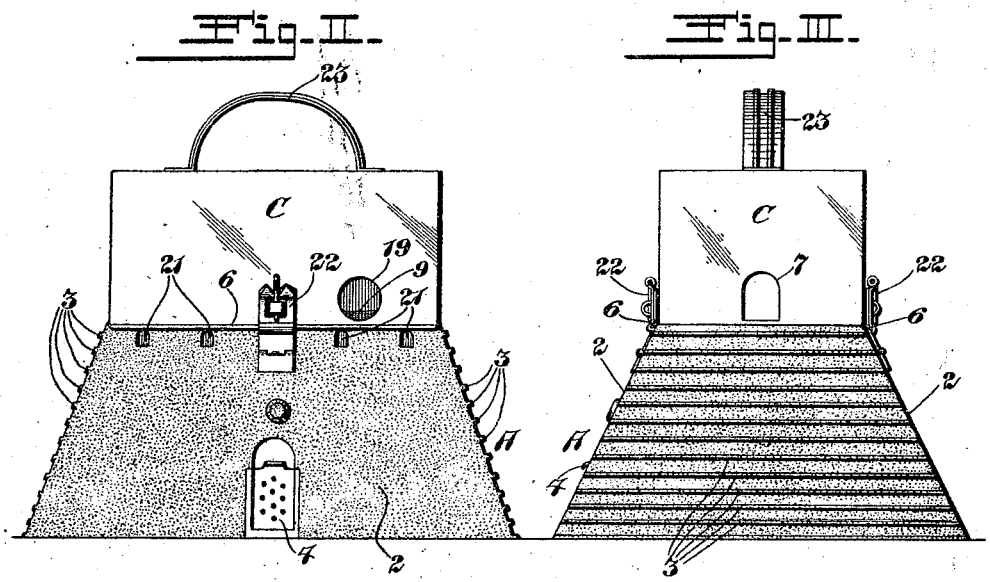

UNITED STATES PATENT OFFICE.

LOUIS HAEGE, OF NEW MEMPHIS, ILLINOIS.

RAT, MOUSE, AND INSECT TRAP.

1,286,601.  Specification of Letters Patent.  Patented Dec. 3, 1918.

Application filed March 9, 1918. Serial No. 221,520.

*To all whom it may concern:*

Be it known that I, LOUIS HAEGE, a citizen of the United States of America, a resident of New Memphis, in the county of Clinton, State of Illinois, have invented certain new and useful Improvements in Rat, Mouse, and Insect Traps, of which the following is a full, clear, and exact description, reference being had to the accompanying drawings, forming a part of this specification.

My invention relates to a trap for capturing rats, mice, or other rodents or small animals and by which insects may also be caught. Briefly stated, the trap is one having therein movable trap doors above which the animals to be captured enter, and between which they fall to an inclosure at the bottom of the trap as a result of efforts to obtain movably supported bait located in the upper portion of the trap. The invention resides mainly in the construction of the movable trap doors, the movable bait holder and certain guards by which the imprisoned animals are prevented from escaping after they have become imprisoned in the inclosure at the bottom of the trap.

Figure I is a top view of my trap.
Fig. II is a side elevation.
Fig. III is an end elevation.
Fig. IV is a vertical longitudinal section.
Fig. V is a vertical cross section.

In the drawings, A designates the lower section of my trap, within which is a compartment B in which the animals and insects caught by my trap are imprisoned. This lower section has a floor 1 and flaring walls 2, said walls being preferably covered with sand or roughened so that the animals and insects to be caught may readily mount the walls at the exterior of the trap. The exteriors of the walls 2 may be provided with steps 3 to permit of the animals climbing more readily to enter the trap, as will hereinafter appear. A doorway closed by a door 4 is preferably provided in one of the walls of the lower section A to permit of the removal of the trapped contents of the lower section, and one or more of said walls may also be provided with ventilation apertures 5.

C designates the upper section of my trap supported by the lower section A, said upper section being of box-like form, comprising a closed top, vertical walls, and open at its lower end. The upper section C is supported in any suitable manner upon the lower section of the trap, preferably by providing ribs 6 upon the upper section which rest upon the upper edge of the lower section. The upper section C extends downwardly into the compartment in the lower section and the lower portions of its walls, being vertical, are spaced from the inclined walls of the lower section as seen in Figs. IV and V.

In opposite walls of the upper section C, at points above the upper end of the lower section A, are entrance openings 7 through which animals may enter said upper section. Platforms 8 are provided within the upper section C adjacent to the openings 7, said platforms being stationary and preferably produced by cutting out portions of the material in the walls of the upper section to form the openings 7 and bending such portions inwardly to form the platforms.

9 designates pivotally mounted trap doors within the upper section C, supported by rods 10 which are hung in sockets 11 on the walls of the upper section containing the openings 7. The pivot rods 10 are spaced from each other so that they occupy positions at opposite sides of the openings 7, and the trap doors, which extend approximately the entire distance between the walls containing the openings 7, have their upper ends bent, or curved, laterally, their lower portions extending downwardly and then toward each other into contact or close proximity with each other, as seen in Fig. V.

D designates a revolving bait holder centrally located in the upper section C at a point above the level of the entrance openings 7. This bait holder is supported by a hanger 12, and it is preferably in the form of a spool comprising heads 13 fixed to a shaft 14 journaled in the hanger 12. A series of bait holding rods 15 are removably fitted to the spool heads 13 so that they may be separated therefrom to impale bait on the rods, after which the latter are returned to their positions between the spool heads. The spool heads are preferably of resilient material so that they may be spread apart sufficiently to permit the removal and reinsertion of the bait rods, and it will be apparent that when bait has been impaled on the said rods and they are inserted into the spool, such bait cannot be displaced therefrom due to efforts of animals to remove it.

The bait holding spool is located midway between the entrance openings 7 and in such position that animals standing upon the stationary platforms 8 at said openings may reach upwardly to the bait holder. Consequently, an animal standing on either of said stationary platforms will attempt to reach bait on the bait holder with its front paws, and in so doing will strike the spool of the bait holder and cause it to revolve, with the result of loss of balance on the part of the animal and its fall from the platform to the trap doors 9. The animal falling onto the lower inwardly extending portions of the trap doors causes them to swing apart, as indicated by dotted lines, Fig. V, and the animal descends the additional distance to the compartment B to become imprisoned therein. The trap doors, immediately following the passage of the animal between them, again assume their closed position, and attempts of the animal to return through the trap doors are of no avail. To guard additionally against ascent of the animal between the trap doors by spreading them apart, I provide a rotatable baffler E beneath the meeting lower portions of the trap doors, this baffler comprising a pivot rod 16 extending longitudinally of the trap doors, the said rod being journaled in the walls to which the trap doors are pivoted, and a series of wings 17 which are adapted to be struck by the animal when an attempt is made to reach the trap doors from the bottom of the compartment B thereby causing the baffler E to be rotated in a manner to prevent an upward climb by the animal thereon.

18 designates guards extending between the pivot rods 10 supporting the trap doors 9 and the walls of the upper section C parallel therewith. These guards serve to prevent animals from climbing upwardly through the spaces at which they are located, and they also serve as stops for limiting the closing movements of the trap doors 9, the latter result being obtained by the outturned upper portions of the trap doors striking against the upper surfaces of said guards 18.

An entrance opening 19 for animals is preferably provided in one of the walls of the upper section, through which animals may gain access to the interior of said upper section to stand upon the upper outturned portions of the trap doors 9. An animal so standing will, upon attempt to reach bait upon the bait holder D, cause rotation of said bait holder and will fall between the trap doors in the same manner as when standing upon one of the platforms 8. It will be obvious that an entrance opening may be provided also in the wall opposite that in which the opening 19 is shown in the drawings. Guards 20 are provided at the ends of the bait holder D, which prevent such access by the animal to the bait holder from the upper portions of the trap doors 9 as to obtain a hold upon the bait holder hanger to remove the bait from the bait holder.

For the purpose of catching insects in my trap, one or more of the walls of the lower section A of the trap is provided with small entrance openings 21, of insufficient size to admit an animal therethrough. Insects climbing up said wall or walls pass through said openings 21, and it will be apparent that, inasmuch as the walls of the lower section flare outwardly from their upper ends and the walls of the upper section C located within the lower section are vertical and spaced from the flaring walls, there is no opportunity for the insects obtaining a hold interior of the trap. The insects therefore fall immediately to the bottom of the compartment B, from which they cannot ascend due to the inclination of the walls of the bottom section. The guards 18 are provided with openings 18' through which such insects as enter the upper section of the trap pass to fall into the lower section.

The sections A and C of my trap may be secured to each other by suitable fastenings 22, and the trap is preferably provided with a handle 23 by which it may be carried.

My trap is advantageous over many other traps for the reason that it is self-setting, and also for the reason that when it is once baited the bait will remain in service for a long period owing to inability of animals to remove it and inaccessibility of the bait to other animals, such as dogs and cats. Another advantage of the trap lies in the fact that a great many animals may be caught in it before any of them are removed. By using a bait holder having a number of bait-receiving members, several different kinds of bait may be placed on the same bait holder.

I claim:—

1. An animal trap having an entrance way, a rotatable bait holder adjacent said entrance way, said bait holder comprising a spool having heads and bait holder rods removably seated in said heads, and a movable closure beneath said bait holder past which animals may fall to become imprisoned beneath said closure.

2. An animal trap comprising a housing having an entranceway, a hanger secured to the top of said housing and separated from the housing walls, a rotatable bait holder mounted in said hanger, and guards between the hanger and the housing walls obstructing access of animals to said bait holder.

In testimony that I claim the foregoing I hereunto affix my signature.

LOUIS HAEGE.